Figure 1:
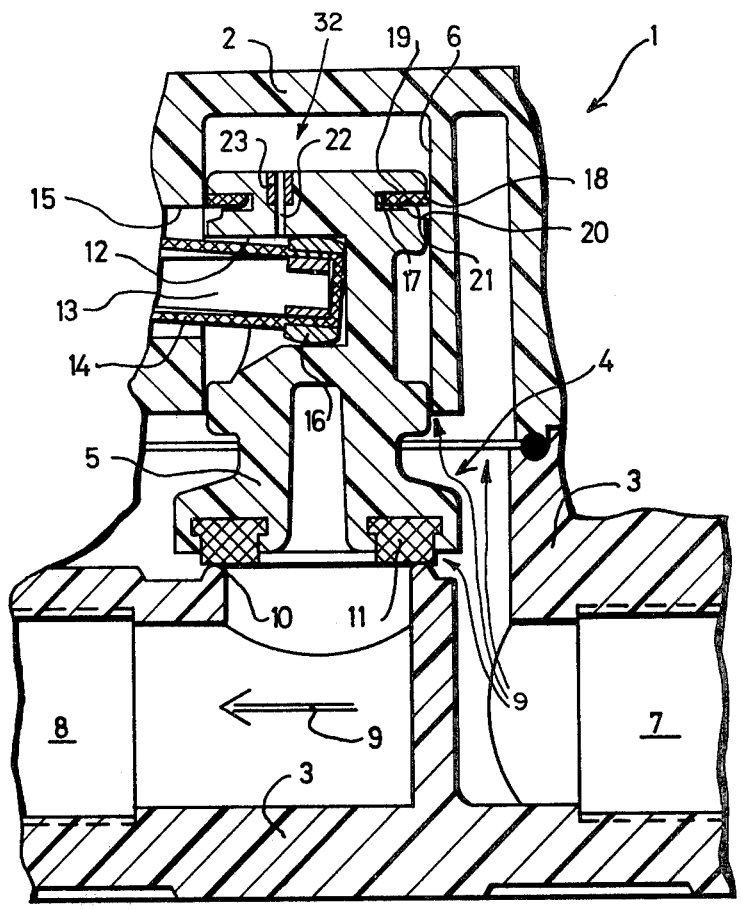

United States Patent [19]

Müller et al.

[11] 4,202,526
[45] May 13, 1980

[54] VALVE

[75] Inventors: Fritz Müller, D 7118 Ingelfingen-Criesbach, Fed. Rep. of Germany; Jürgen Kenner; Wolfgang Schädlich, both of Weissbach, Fed. Rep. of Germany

[73] Assignee: Fritz Muller, Ingelfingen-Criesbach, Fed. Rep. of Germany

[21] Appl. No.: 839,184

[22] Filed: Oct. 4, 1977

[30] Foreign Application Priority Data

Oct. 9, 1976 [DE] Fed. Rep. of Germany ....... 2645802

[51] Int. Cl.² ........................................... F16K 31/143
[52] U.S. Cl. ....................................... 251/51; 92/143; 137/512.15; 251/52; 277/168; 277/170
[58] Field of Search ................. 92/8, 143; 137/512.15, 137/854; 251/48, 30, 50, 51, 52, 54, 55, 231; 277/168, 172, 170, 171

[56] References Cited

U.S. PATENT DOCUMENTS

| 132,523 | 10/1872 | Cooper | 251/51 |
|---|---|---|---|
| 374,637 | 12/1887 | Smith | 251/54 |
| 793,698 | 7/1905 | Walter | 251/54 |
| 1,299,815 | 4/1919 | Bayles | 137/512.15 |
| 1,520,892 | 12/1924 | Steensen | 251/54 |
| 1,634,949 | 7/1927 | LeValley | 137/512.15 |
| 1,655,729 | 1/1928 | Jones | 251/54 |
| 2,236,320 | 3/1941 | Mosel | 137/512.15 |
| 2,270,932 | 1/1942 | Cornelius | 251/231 |
| 2,368,744 | 2/1945 | Carey | 277/171 UX |
| 2,614,793 | 10/1952 | Storm | 251/DIG. 1 |
| 2,918,248 | 12/1959 | Schoenrock, Jr. | 251/54 |
| 3,102,711 | 9/1963 | Filliung | 251/54 |
| 3,347,555 | 10/1967 | Norton | 277/171 |
| 3,423,064 | 1/1969 | Harland et al. | 251/231 |
| 3,933,337 | 1/1976 | Morris et al. | 251/54 |
| 4,027,849 | 6/1977 | Müller | 251/30 |

FOREIGN PATENT DOCUMENTS 162381 1/1904 Fed. Rep. of Germany ...... 137/512.15

Primary Examiner—Martin P. Schwadron
Assistant Examiner—G. L. Walton

[57] ABSTRACT

The valve having a casing with an inflow and outflow connection which can be separated from or connected to one another by means of a movable valve member which can be brought to bear against a valve seat, the movable valve member being provided with a damping mechanism which prevents blow-like, rapid actuation at least in the closing direction. The damping or restraining mechanism consists of a displacer which is mechanically connected with the valve member, said displacer, during the movement of the valve member, slowly changing its volume through a narrow passage or leak. A non-return valve allows a more rapid movement in the opposite direction.

18 Claims, 8 Drawing Figures

VALVE

The present invention relates to a valve having a casing with an inflow and outflow opening which can be separated from one another by movable valve member brought to bear against a valve seat.

During the closing of valves, in particular if the valve is arranged in the run of a pipeline with a rapidly flowing fluid, a so-called "water hammer" frequently occurs. The cause of the blow-like closing of the valve is that, in the case of valves closing in the direction of pressure, the valve member is additionally advanced to the valve seat by the flowing medium and that towards the end of the closing operation the kinetic energy of the of the flowing liquid column must be absorbed. This results in a considerable pressure increase which may lead to the destruction of the valve or of the connected pipeline system. To prevent these blow-like loads, expansion chambers or the like could be arranged in the pipeline system which, however, require a considerable additional expenditure and which, due to their inherent elasticity, may influence the dynamic behaviour of the liquid in pipeline systems in an undesirable manner.

It is the object of the present invention to design a valve of known construction so that, even if the valve member closes in the direction of flow, the blow-like load towards the end of the closing operation is reduced to such a degree that detrimental pressure peaks are no longer occurring.

According to the invention, this object is achieved by connecting the movable valve member to a displacer which changes its volume upon movement of the valve member, by providing the displacer with a non-return valve and by arranging a narrow passage in parallel to the non-return valve, if necessary.

During its closing motion the movable valve member must carry along the displacer, the volume change of which can only take place at a relatively low rate due to the narrow passage. On the other hand, in the opposite direction the narrow passage is bridged by the non-return valve so that the opening motion can take place without delay or almost without delay. By the combination of displacer, non-return valve and passage the desired slow closing is achieved without, on the other hand, appreciably increasing the time for the opening of the valve.

The displacer may, for example, be designed as a chamber sealed off by a diaphragm and the non-return valve may be inserted into the diaphragm or into the casing surrounding the chamber sealed by the diaphragm. However, according to one embodiment of the invention the displacer is preferably a piston which is displaceable in a cylinder during the movement of the valve member and the piston is provided with a recoil cushioning gasket, also called damping disk, functioning as non-return valve. For this purpose, the recoil cushioning gasket may be designed as a cup seal as it is frequently used in air pumps and the like. However, in a particularly preferred construction the recoil cushioning gasket is designed as a ring accommodated in a groove of the piston. Rings of this type can be manufactured in a great variety of configurations from a wide choice of materials and can be easily installed without additional expenditure, since they are retained in the groove of the piston. Mounting in the groove ensures a completely reliable fixation of the piston ring.

The narrow passage which allows the follow-up of the piston due to the volume compensation in the chamber sealed off by the piston or diaphragm may preferably be constituted by a leak of the recoil cushioning gasket or by at least one opening penetrating the recoil cushioning gasket.

Preferably, the ring gasket does not fit tightly to the piston but with a radial play. This has the advantage that the piston is not guided by the ring gasket but moved into the closing position within wide limits independently of the ring gasket. This ensures that the valve member is in a planar position on the valve seat even if the valve member is rigidly connected with the piston or, as preferably provided, if it is integral with the piston.

In preferred embodiments of the invention, the ring gasket has the shape of a circular ring disk and consists of soft elastomer, i.e. rubbery material. Due to the elasticity of the rubbery material the ring gasket can be fitted on the single-piece piston, whereupon it engages in the groove. The groove is designed so that the damping disk bears against a plane face of the groove in the closing direction of the valve, whereas in the opening direction it bears against an inclined face whereby the damping disk acts as a non-return valve because, due to the overpressure in the chamber sealed off by the piston, its outer perimeter slightly lifting off from the cylinder surface.

However, as provided in other preferred embodiments, the ring gasket may also be designed as a radially through-slotted circular ring disk and consist of a tough plastic material, such as polyamide or tetrafluoroethylene or PTFE or the like. Rings of this type are particularly wear-resistant and withstand high pressures as well as aggressive media. Moreover, the advantage of a ring gasket of this type consists in that the radial slot is, at the same time, the narrow passage.

To prevent restraining of the opening operation of the valve, according to a preferred embodiment of the invention the ring gasket is provided with cutouts and openings, in particular axial holes. During the closing motion, these holes bear against the plane groove wall and are thus sealed off. However, during the opening motion, the inner ring portion bears against the inclined groove flank and is lifted off from the plane face so that the fluid in the chamber can flow through the holes.

In a further development of the invention the ring gasket is provided with radial slots connecting the holes to the outer perimeter. The advantage of this embodiment consists in that the arrangement is largely unaffected by minor contaminations on the cylinder surface, since the ring gasket is capable of moving in the form of individual segments, thus ensuring a better adjustment to the surface. The narrow passage is constituted by the short slot sections which are located between the cylinder surface and the outer perimeter of the piston because the radially inner portions are covered by the plane groove flank of the piston.

To obtain a still better matching and free movability of the ring gasket, in preferred embodiments of the invention, the ring gasket is divided by radial, through-cuts into segments and the inner perimeter is provided with a toothing, if necessary. The narrow distances between the segments have the same function as the radial slots described above and the inner toothing has the same function as the axial holes described above. Due to the subdivision of the segments the ring gasket may consist of a relatively stiff, almost rigid material, since for the installation deformation is not necessary but only insertion into the groove.

Additionally to or instead of the slots, the piston may be provided with a bore serving as a narrow passage. This bore which is arranged in parallel to the ring gasket is mainly provided in cases where the slots produce a too high flow resistance and the closing speed is to be set to an indefinite value.

Although the ring gasket or the damping disk always produces a certain amount of friction which, of course, to some degree depends on the medium flowing through, it may be desirable to increase this friction still further. In preferred embodiments of the invention a friction element restraining the motion of the valve member is therefore additionally provided. For this purpose, the damping disk may, at the same time, be designed as friction element. However, the action of the friction element shall be directional because during the opening motion of the valve friction is not desired. In preferred embodiments of the invention, the damping disk therefore consists of at least two segments and the groove in the piston is provided with an inclined face. The segments are provided with a corresponding inclined flank cooperating with the inclined face. In this case, the arrangement is such that, during the closing motion of the valve, the segments are radially outwardly forced against the cylinder surface by the inclined flank and the inclined face, whereas during the movement of the valve member in the opening direction the segments lift off from the cylinder surface. The desired directional friction brake is thus achieved without additional expenditure. The intensity of the friction brake effect can be freely selected and adjusted within wide limits by an appropriate choice of the ring material and, in particular, by the choice of the angle of taper of the inclined face and of the inclined flank.

Basically, the arrangement according to the invention is suited for valves of almost all types. However, the principle of the invention can be realized in a particularly advantageous manner in cases where, according to a preferred embodiment, the valve member is integral with the piston and the valve member is arranged at the one front side and the ring gasket at the other end portion of the piston. In this case the piston is preferably provided with a lateral cutout into which an actuation arm which can be swivelled or shifted in the axial direction of the piston radially engages.

Figure 4:
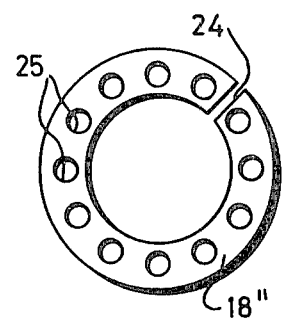
Figures 5, 6:
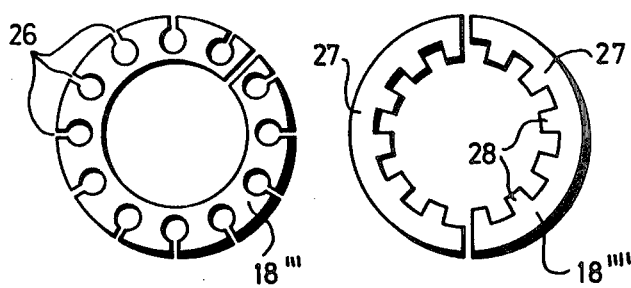
Figure 7:
Figure 8:
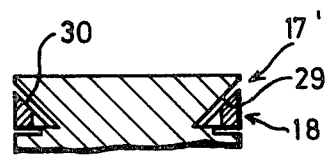

Further details and developments of the present invention will appear from the following description of embodiments represented in the drawing in connection with the claims. In a simplified, schematized representation the drawings show the following:

FIG. 1 a sectional view through a straight-way valve, the drive system which is not essential for the comprehension of the invention having been omitted;

FIGS. 2 through 6 are plan views respectively various embodiments of ring gaskets and FIGS. 7 and 8 are sectional views of the ring gasket according to FIG. 6 during the closing or opening operation.

In a valve casing 1 comprising an upper part 2 and a lower part 3 a movable valve member 4 in the form of a piston 5 is provided which can be displaced axially and is guided freely in a cylinder bore 6 of the upper part 2. In the lower part 3 threaded connection holes 7 and 8 are incorporated to which pipelines can be connected by means of appropriate screw connection joints. In this case the medium flows through the open valve in the direction of arrow 9; consequently, the threaded connection hole 7 is the inflow opening and the threaded connection hole 8 the outflow opening. Since the upper part of the casing is in communication (in line) with both, the inflow and outflow openings, the main fluid flow passes about the loosely held piston into and out of the part 2. Between the two threaded connection holes 7 and 8 a ring-shaped valve seat 10 is incorporated, the axis of the cylinder bore 6 being approximately vertical to the ring area of said valve seat. Preferably, the upper part 2 and the lower part 3 as well as piston 5 are respectively single-piece constructions from plastic material.

In piston 5, at the front side facing the valve seat 10, an elastic valve seal 11 is inserted which, in the closed position of the valve, tightly bears against the valve seat 10, thus separating the threaded connection hole 7 from the threaded connection hole 8.

Piston 5 is provided with a radial cutout 12 into which an actuation arm 13 extends which, in turn, is covered by an elastic sheath 14 extending in the form of a bellows (not represented) which is inserted into a cutout 15 in the upper part 2 and which tightly seals off the cutout 15 towards the outside. A ring 16 mounted on the sheath 14 of the actuation arm 13 bears with its spherical outer circumferential surface against the surface of cutout 12. Near the upper part 2 the actuation arm 13 is arranged to swivel and the other lever arm which is not represented is connected with a drive system of the same type as, for example, described and represented in DT-OS 24 16 359 corresponding to U.S. Pat. No. 4,027,849.

In the vicinity of the end portion of piston 5 facing away from valve seat 10 a circumferential groove 17 is provided into which a ring gasket 18 of the same type as represented in detail in the various embodiments according to FIGS. 2 through 6 is inserted. The outer diameter of the ring gasket 18 is dimensioned so that it bears against the surface of the cylinder bore 6. Its inner diameter is slightly larger than the diameter of the bottom of the circumferential groove 17. The circumferential groove 17 has a plane flank 19 facing away from the valve seat 10 and a flank 20 which is tapered at least over a certain range of its radial extension. During the motion of piston 5 in the direction towards the valve seat 10 the ring gasket 18 which frictionally bears against the surface of the cylinder bore 6 is in close contact with the plane flank 19. However, during the motion in the opposite direction, when the valve opens, the ring gasket 18 bears against the tapered flank 20. Preferably, the tapered flank radially extends from the outer diameter of the piston over approximately half the groove depth towards the inside, joined by a wall portion 21 which is also approximately planar and extends to the bottom of groove 17.

Furthermore, starting from the front face facing away from the valve seat 10, the piston 5 is provided with a bore 22 which leads into the cutout 12. Into the bore 22 a threaded sleeve 23 is inserted the inner diameter of which is calibrated.

When closing the valve the piston 5 is moved towards the valve seat 10 until the valve seal 11 bears against valve seat 10; this closed position is represented in FIG. 1. During the movement of the piston towards the valve seat the ring gasket 18 bears against the plane flank 19, on the one hand, and its outer perimeter against the surface of the cylinder bore 6, on the other hand, to form a seal. In the space 32 of cylinder bore 6 which is sealed off towards the outside by piston 5 an underpressure is thus generated which counteracts and delays the closing motion of piston 5. A slow pressure compensation takes place through bore 22. The delayed closing of the piston results in a soft contacting of the piston on the seat and the undesired pressure increases due to the so-called water hammer are avoided or at least reduced to a harmless degree.

To open the valve, the piston 5 is moved away from valve seat 10 by swinging the actuation arm 13. In this case, the ring gasket 18 bears against the wall portion 21 and the radially outer portion of the ring gasket 18 bears against the tapered flank 20. Due to this conical deformation of the ring gasket 18, fluid can escape past the ring gasket into space 32 so that the throttling effect of the bore 22 does not occur. Thus, the valve can practically open as rapidly as a valve of the same type without ring gasket 18. The elimination of the damping effect during the opening is essential particularly in magnetically operated valves because, due to the maximum air gap between yoke and armature, at the beginning of the tractive motion the magnet generates a smaller force than afterwards when the armature gradually approaches the yoke.

Figure 2:
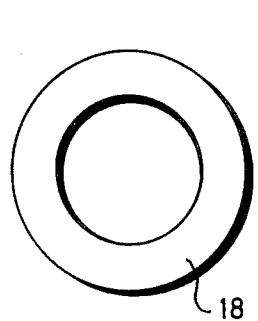
Figure 3:
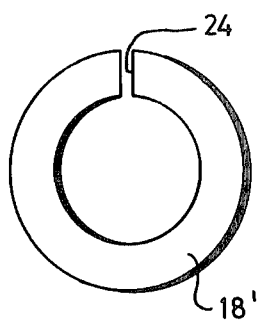

FIG. 2 shows a ring gasket 18 which consists of a soft elastomer, i.e. a rubbery plastic material. Due to its elastic deformability a ring gasket of this type can be easily slipped over the piston 5 until it engages in the circumferential groove 17.

However, the ring gaskets according to FIGS. 3 through 6 consists of a relatively stiff material, such as polyamide or tetrafluoroethylene or similar plastics. In this connection, the ring gasket 18' according to FIG. 3 has a radial slot 24 which enables the ring to be deformed to such a degree that it can be inserted into the circumferential groove 17. The gap effect due to slot 24 provides a narrow passage which is arranged in parallel to bore 22. In this connection, by appropriate dimensioning and designing of the ring gasket 18', it can be ensured that the slot 24 is very small in the installed condition so that only bore 22 is effective. Conversely, dimensioning may be such that bore 22 is completely unnecessary and that the restricted flow of fluid through the slots 24 results in the desired closing delay.

For an even more rapid opening operation, as is possible with ring gasket 18' which only adjusts itself to a small degree to the conical face, a ring gasket 18" according to FIG. 4 is provided with axial throughholes 25. During the closing motion the holes 25 bear against the plane flank 19 and therefore produce no effect. However, during the opening motion the largest portion of the cross-sectional area is facing the tapered flank 20 so that the fluid can flow through the holes 25.

In the embodiment of a ring gasket 18''' represented in FIG. 5 slots 26 leading from the outer perimeter of the ring gasket to the holes are provided which, on the one hand, assume the function of the bore 22 and, on the other hand, result in unsusceptibility to contamination because the individual sections of the ring gasket between the holes bear against the surface of the cylinder bore 6 in the same manner as individual segments.

Whereas the ring gaskets according to FIGS. 2 through 5 were of one single piece, the ring gasket 18'''' according to FIG. 6 consists of at least two segments 27. For the installation the individual segments are merely inserted into the circumferential grooves 17. The effect of the holes 25 is produced by internal cutouts in the form of an internal toothing 28.

The ring gaskets, in particular if they are designed according to FIG. 6, may additionally be used as friction brake. For this purpose, the ring gaskets have a triangular cross-section as shown in FIGS. 7 and 8. In this case, the ring gasket is preferably provided with a slot 24 or subdivided into segments 27. The flank facing away from valve seat 10 is designed as tapered ring face 29 so that the circumferential groove 17' has an approximately triangular cross-section, one vertex of the triangle pointing towards the axis of piston 5 and one side of the triangle extending in parallel to the surface line. During the opening motion the ring gasket bears against the wall portion 21 facing the valve seat 10. However, during the closing motion represented in FIG. 7, the ring gasket bears against the tapered ring face 29 and is slightly expanded during the forward motion of the piston in the closing direction and pressed against the wall of the cylinder bore 6. This results in a friction effect which, however, is only acting in the closing direction and not in the opening direction of the valve.

It shall be understood that the present invention is not restricted to the embodiments shown by way of example and that deviations therefrom are possible without exceeding the scope of the invention. In particular, individual features of the invention can be applied separately or in the combination of a plurality of features. For example, the ring gasket 18 according to FIG. 2 may also have a triangular cross-section, although the embodiment of the ring gasket in the form of a friction brake expediently conforms to FIG. 6.

Having thus fully described my invention, what I claim as new and wish to secure by Letters Patent is:

1. A fluid valve comprising a casing having an inlet and an outlet opening separated by a valve seat and defining an internal cylinder in fluid communication therewith, a piston located in said cylinder defining therewith an enclosed space, restricted passage means extending from said enclosed space for draining fluid therefore, and means for moving said piston toward and away from said valve seat whereby one of its ends engages and disengages with said valve seat and its other end simultaneously changing the volume of said enclosed space, the wall of the piston being at least in part spaced from the wall of said cylinder to permit passage of fluid therebetween and a unidirectional seal carried by said piston adjacent its other end and engaging the wall of said cylinder comprising a substantially annular deformable gasket arranged in a groove formed in the wall of said piston, said groove having a first wall furthest from said valve seat and a second wall closest to said valve seat, said first wall being planar and said second wall being provided with a recess adjacent its outer peripheral edge, said gasket having at least one planar surface conforming to and adjacent said planar wall of said groove and being deformable on movement of said piston toward said valve seat to abut against the first wall of the groove and in cooperation with the wall of said cylinder to seal said cylinder from said inlet and outlet openings and on movement away from said valve seat to abut against the second wall of the groove and in cooperation with the cylinder wall to be deformed into said recess to provide a passage between said cylinder and said gasket for said fluid.

2. The valve according to claim 1, wherein the wall of said groove closest to said valve seat is formed with a conically outward recess.

3. The valve seat according to claim 1, wherein said piston at least beyond the wall furthest from said valve seat extends in sliding contact with the wall of said cylinder.

4. The valve according to claim 1, wherein the planar wall of said groove extends in a direction perpendicular to the axis of movement of said piston.

5. The valve according to claim 1, wherein said gasket has at least an inner diameter greater than the inner diameter of said groove so as to be freely movable within said groove.

6. The valve according to claim 1, wherein said gasket comprises a continuous annulus of soft elastomeric material.

7. The valve according to claim 1, wherein said gasket comprises a split ring formed of a non-elastic synthetic material.

8. The valve according to claim 7, wherein said synthetic material is selected from the group consisting of polyamides, tetrafluoroethylene and PTFE.

9. The valve according to claim 6, including one or more axial openings formed in said gasket.

10. The valve according to claim 9, including one or more radial openings extending from one or more of said axial openings.

11. The valve according to claim 7, including one or more axial openings formed in said gasket.

12. The valve according to claim 11, including one or more radial openings extending from one or more of said axial openings.

13. The valve according to claim 7, wherein said ring is formed of two or more arcuate segments.

14. The valve according to claim 13, wherein the inner peripheral edge of each segment is formed with toothings.

15. The valve according to claim 1, wherein said gasket is formed of friction material cooperating with the surface of the wall of said cylinder to effect a braking of said piston.

16. The valve according claim 1 wherein said restricted passage is a bore formed axially through said piston.

17. The valve according to claim 16 wherein said bore is provided with a removable sleeve whereby said restriction may be varied.

18. A fluid valve comprising a casing having an inlet and outlet opening separated by a valve seat and defining an internal cylinder in communication therewith, a piston located in said cylinder and means for moving said piston toward and away from said valve seat whereby one of its ends engages and disengages with said valve seat and its other end simultaneously changes the volume of said cylinder, the wall of the piston being at least in part spaced from the wall of said cylinder to permit passage of fluid therebetween and a unidirectional seal carried by said piston adjacent its other end comprising a substantially annular radially distendable gasket arranged in a groove formed in the wall of said piston, said groove having a first wall furthest from said valve seat and a second wall closest to said valve seat, said first wall being inclined with respect to the central axis of said piston, the surface of said gasket adjacent said inclined wall of said groove being inclined parallel thereto whereby on movement of said piston toward said valve seat said gasket abuts against the inclinded wall being thereby radially distendable into engagement with the wall of the cylinder to seal said cylinder from said inlet and outlet openings and said second wall having a recess whereby on movement away from said valve seat said gasket is received therein to provide a passage between the wall of said cylinder and said gasket for said fluid.

* * * * *